United States Patent [19]

Tanabe

[11] Patent Number: 5,318,419
[45] Date of Patent: Jun. 7, 1994

[54] ALIGNING JIG FOR LOOSE WIRES

[75] Inventor: Akio Tanabe, Ichihara, Japan

[73] Assignee: The Furukawa Electric Co., Ltd., Tokyo, Japan

[21] Appl. No.: 938,618

[22] Filed: Sep. 1, 1992

[30] Foreign Application Priority Data

Sep. 4, 1991 [JP] Japan .................................. 3-224032
Sep. 25, 1991 [JP] Japan .................................. 3-245447

[51] Int. Cl.$^5$ ................................................ G02B 5/16
[52] U.S. Cl. ......................................... 425/123; 29/868;
156/180; 156/181; 156/434; 264/1.5; 264/1.6;
264/261; 425/110; 425/DIG. 29
[58] Field of Search ............... 425/110, 114, DIG. 29,
425/112, 123; 264/1.5, 1.6, 22, 261; 156/180,
181, 434, 433, 441; 29/868, 745, 749, 753

[56] References Cited

U.S. PATENT DOCUMENTS

| | | | |
|---|---|---|---|
| 3,919,037 | 11/1975 | Miller | 156/502 |
| 4,057,448 | 11/1977 | Miller | 156/158 |
| 4,289,558 | 9/1981 | Eichenbaum et al. | 156/179 |
| 4,548,669 | 10/1985 | Steinmann et al. | 156/433 |
| 4,645,292 | 2/1987 | Sammueller | 350/96.2 |
| 4,837,405 | 6/1989 | Bonjour et al. | 174/136 |
| 4,963,222 | 10/1990 | Bonjour et al. | 156/393 |
| 4,964,689 | 10/1990 | Wichansky | 156/433 |
| 5,010,642 | 4/1991 | Takahashi et al. | 29/868 |

FOREIGN PATENT DOCUMENTS

| | | |
|---|---|---|
| 0097414 | 4/1983 | European Pat. Off. |
| 0376131A3 | 12/1989 | European Pat. Off. |
| 3328052 | 2/1985 | Fed. Rep. of Germany |
| 0061955 | 3/1982 | France |
| 0272211 | 6/1988 | France |
| 54-50342 | 4/1979 | Japan |
| 3-200902 | 9/1991 | Japan |

Primary Examiner—Khanh Nguyen
Attorney, Agent, or Firm—Frishauf, Holtz, Goodman & Woodward

[57] ABSTRACT

An aligning jig for loose wires, which is equipped with the first and second retaining sections for retaining and temporarily fixing a plurality of loose wires, an arraying section which arrays the plurality of loose wires in an optional loading order in a plurality of arraying grooves arrayed widthwise and holds the loose wires in a predetermined order, at least one arranging section which arranges the plurality of loose wires, arrayed in the arraying section, to a preset specified width, and a fixing section which glues the plurality of loose wires, which have been temporarily fixed by the first and second retaining sections and arranged to the specified width, while maintaining the arranging order, thus fixing the wires to the specified width.

13 Claims, 10 Drawing Sheets

F I G. 3
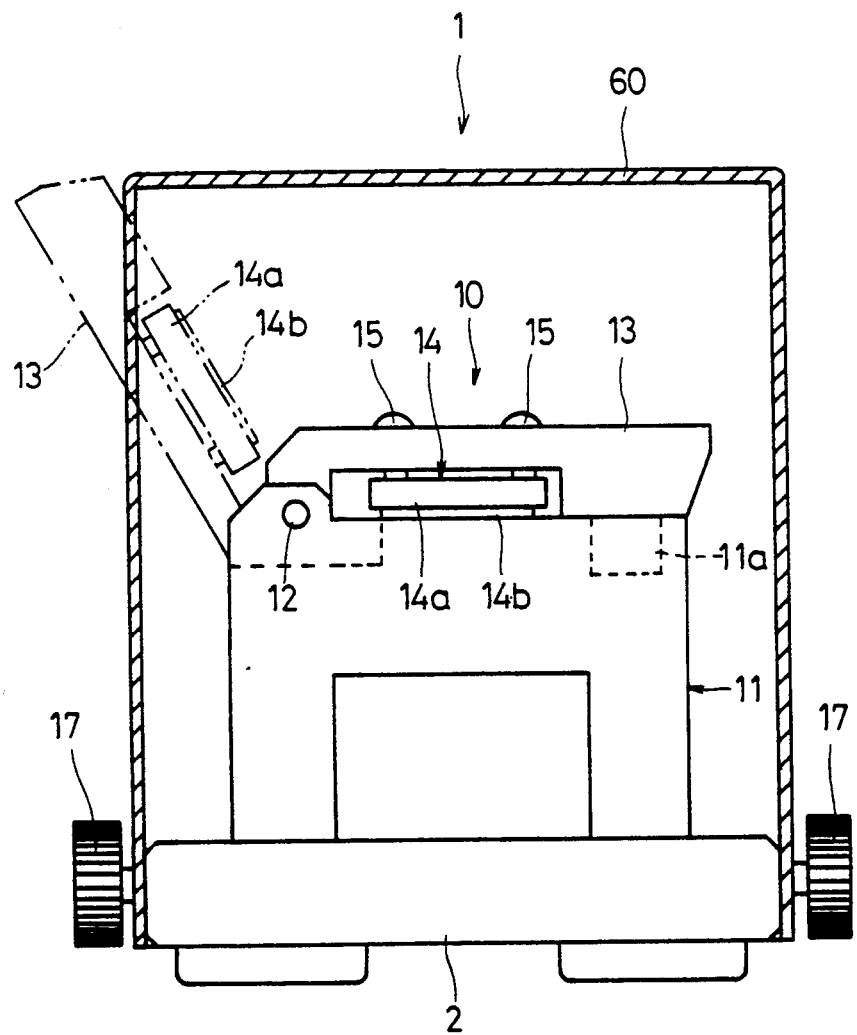

ALIGNING JIG FOR LOOSE WIRES

BACKGROUND OF THE INVENTION

1. Field of the Invention

The present invention relates to an aligning jig for loose wires, which arranges a plurality of loose wires in a prescribed arranging order, and glues and fixes these loose wires in a ribbon shape, while maintaining their prescribed width.

2. Description of Related Art

To perform connection or the like between optical fibers for optical communication or between optical fibers and an optical connector, a fusion splicing device, which fusion-splices a plurality of optical fibers in a batch at a time, is used. When using such a fusion splicing device to fusion-splice loose optical fibers, conventionally, an aligning jig, which aligns the optical fibers into a form of tape to shape them into a ribbon-like tape fiber of a prescribed width, is used to permit easy handling of a plurality of optical fibers.

As such an aligning jig, there is, for example, a jig which has a retaining member for retaining a plurality of loose wires, and an aligning member which is allowed to slide along a slide guide, retains one end of the loose wires by the foregoing retaining member, places and lays the loose wires in a predetermined order into an aligning groove, which is formed in a vertical direction of the foregoing aligning member, aligns the loose wires into a tape form, with no looseness left, between the retaining member and the aligning member by sliding the aligning member along the slide guide, then applies adhesive or the like to these aligned loose wires to form them into a ribbon-like tape fiber.

When shaping a plurality of optical fibers into a tape by using the aforementioned aligning jig, the width of the alinging groove is set slightly greater than the diameter of the optical fiber to provide a play since the optical fibers are laid into the aligning groove formed in the vertical direction. This presents a problem wherein some of the optical fibers are partially dislocated from the aligning direction by that play when the optical fibers are aligned into a tape form, adversely affecting the aligning accuracy. Furthermore, since the aligning groove is formed vertically, if optical fibers are arranged in a wrong order, then all optical fibers above the wrong optical fiber must be removed from the aligning groove and rearranged, resulting in a complicated operation.

Additionally, the jig is disadvantageous in that a plurality of optical fibers are aligned into the form of a tape by sliding the aligning member, causing the optical fibers to produce friction with the aligning groove when the aligning member is slid, consequently scratching the sheaths of the optical fibers, and the jig requires troublesome handling and cannot be easily used unless the operator is skilled in handling.

SUMMARY OF THE INVENTION

An object of the present invention is to provide an aligning jig for loose wires, which permits easy aligning of a plurality of loose wires without the need of skill.

Another object of the present invention is to provide an aligning jig for loose wires, which makes it possible to align a plurality of loose wires in a desired sequence and form them into a tape without causing damage to the wires.

Still another object of the present invention is to provide an aligning jig which has an aligning member with a simple structure for arranging loose wires and which is available at a low cost.

To fulfill the above-mentioned objects, the aligning jig for loose wires in accordance with the present invention is equipped with first and second retaining sections, which retain and temporarily fix a plurality of loose wires, an arraying section which arrays the loose wires in an optional loading order in a plurality of arranging grooves arrayed widthwise and holds the loose wires in a predetermined order, at least one arranging section which arranges the loose wires arrayed in the arraying section to a preset specified width, and a fixing section which glues the loose wires, which have been temporarily fixed by the first and second retaining sections and arranged to the specified width, while maintaining the arranging order, thus fixing the wires to the specified width.

The first retaining section temporarily fixes the free end of the loose wires at an appropriate point of the free end. The arraying section arranges the free end of the loose wires in the respective arraying grooves in an optional loading order and holds same in a predetermined order, which loose wires have been temporarily fixed in the appropriate position. The arranging section arranges the loose wires, which have been arranged in the respective grooves in the predetermined loading order, to a predetermined width. The second retaining section temporarily fixes the free end of the loose wires, which have been arranged to the predetermined width, at another point of the free end. The fixing section glues and fixes to a predetermined width the loose wires, which have been temporarily fixed by the first and second retaining sections and which have been arranged to the predetermined width, while maintaining the arranging order.

In accordance with the aligning jig for loose wires of the present invention, outstanding effects are given; for example, a plurality of loose wires can be easily aligned without the need of skill and accurately aligned into the form of a tape without damaging the loose wires when aligning them.

The above and other objects, features and advantages of the invention will become more apparent from the following detailed description taken in connection with the accompanying drawings.

BRIEF DESCRIPTION OF THE DRAWINGS

FIG. 3 is a side view wherein the aligning jig for loose wires shown in FIG. 1 is observed from the left;

DETAILED DESCRIPTION OF THE INVENTION

An embodiment of the present invention will now be described in detail in relation to FIG. 1 through FIG. 10.

Figure 1:
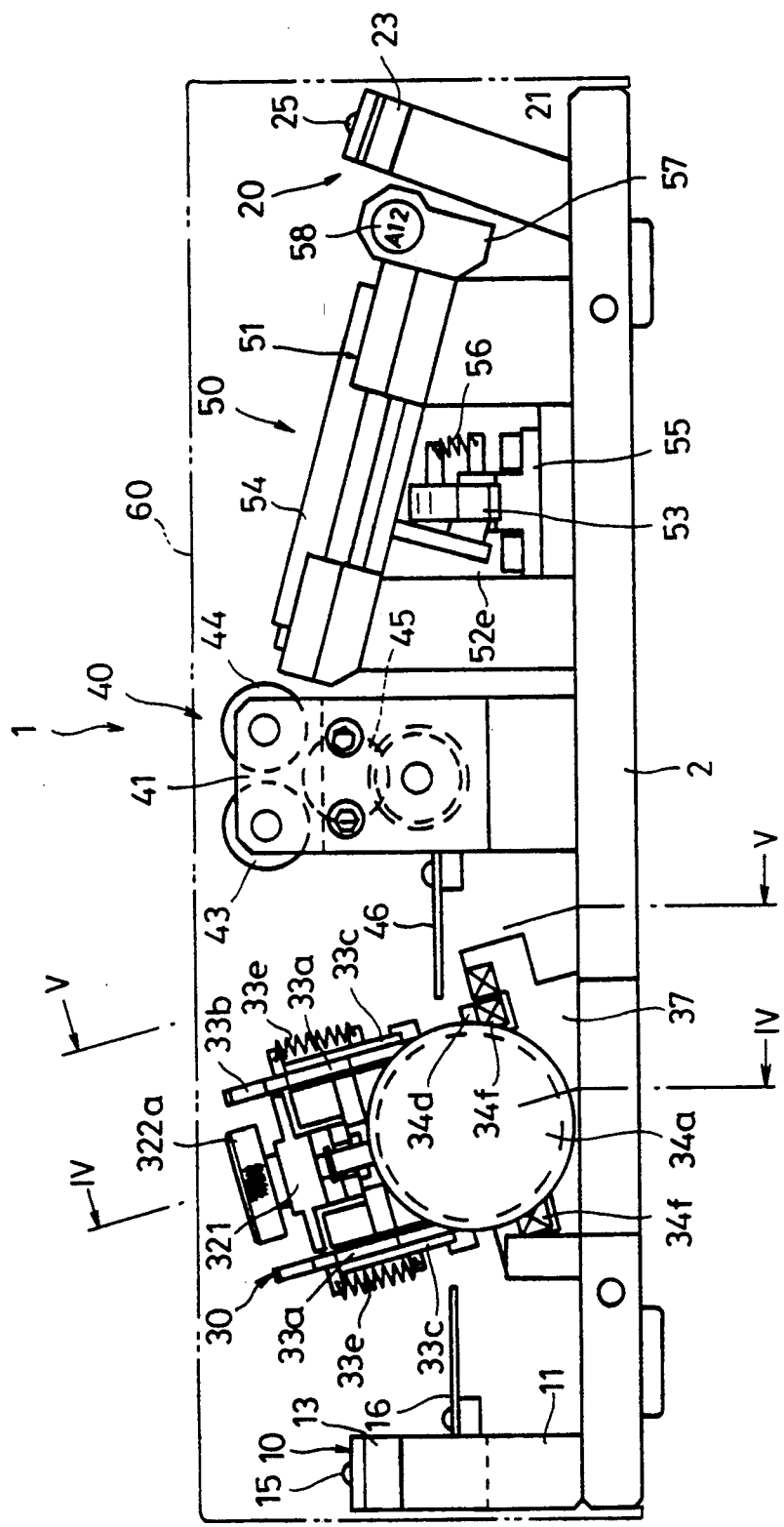
FIG. 1 is a front view which illustrates an aligning jig for loose wires in accordance with the present invention.
Figure 2:
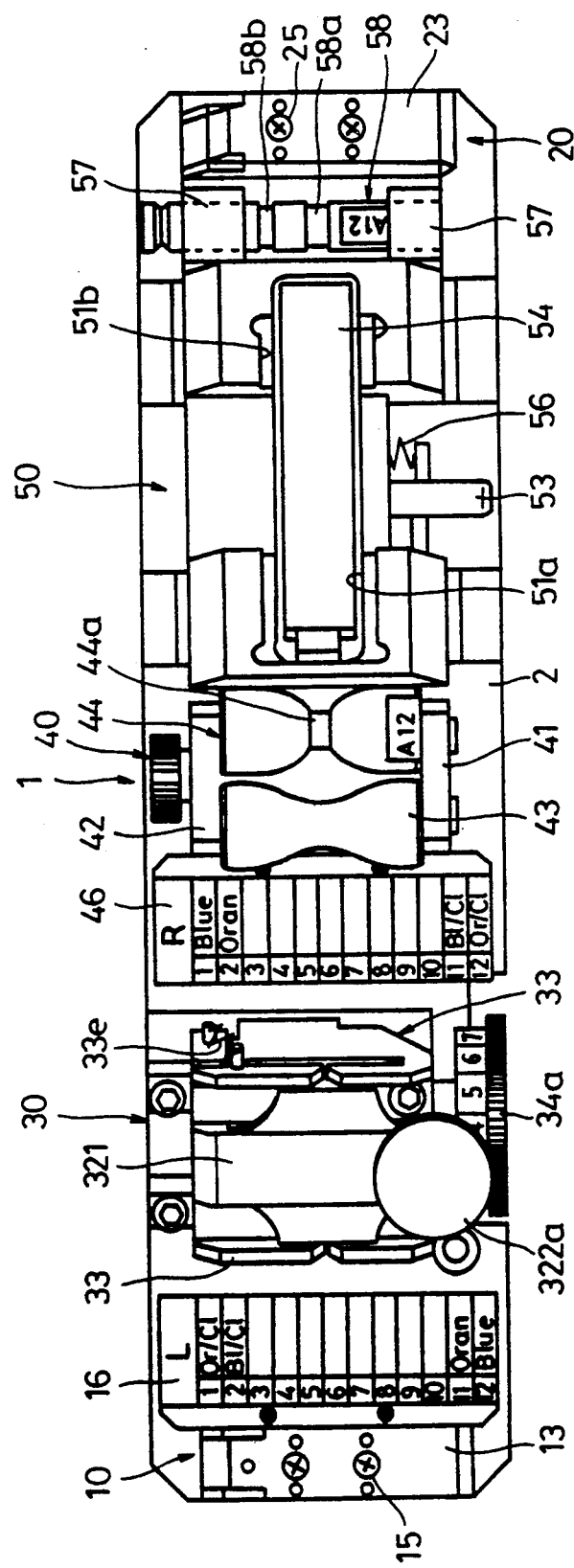
FIG. 2 is a top plan view of the aligning jig for loose wires in accordance with the present invention.

As shown in FIG. 1 and FIG. 2, an aligning jig 1 for loose wires is equipped with retaining sections 10 and 20, an arraying section 30, an arranging section 40, and a fixing section 50 mounted on a base 2; and a cover 60 is attached to the jig in the case of carrying or the like.

The retaining sections 10 and 20 function to temporarily retain a plurality of loose wires, e.g., a plurality of optical fibers, lengthwise at predetermined intervals. As shown in FIG. 1, the retaining section 10 is located on the left end of the base 2, while the retaining section 20 is located on the right end, the retaining section 20 being tilted rightward and installed at the right end of the base 2. The retaining sections 10 and 20 share approximately the same configuration; therefore, only the retaining section 10 will be explained, and the other retaining section 20 will be just assigned symbols corresponding to those shown in the figures, thus omitting the explanation.

The retaining section 10 is mounted upright on the left end of the base 2; as shown in FIG. 3, a clamp member 13 is mounted on the top of a support base 11 by a pin 12 so that it may rise and fall. The clamp member 13 is engaged with the support base 11 by the magnetic force of a magnet 11a which is embedded in the upper part of the support base 11, and it has a pressing member 14 which presses a plurality of optical fibers, not shown, against the support base 11, installed on its bottom surface by adjusting screws 15 and 15.

The pressing member 14 has a friction plate 14b made of rubber or the like which is installed on the bottom surfaces of a base plate 14a and a base plate 14a as their integral parts; and the pressing force applied to a plurality of optical fibers against the support base 11 is adjusted by the adjusting screws 15 and 15. As shown in FIG. 1 and FIG. 2, an indicator plate 16, which gives an arranging order by showing the colors of a plurality of optical fiber sheaths, is installed on the right side surface of the retaining section 10. In FIG. 3, symbols 17 and 17 denote mounting screws for installing the cover 60 on the base 20 in a manner that it can be installed and removed.

The arraying section 30 arranges a plurality of optical fibers in the specified arraying grooves, which are arranged widthwise, in an optional loading order and holds the fibers in a predetermined order, and as shown in FIG. 4 through FIG. 8, it has an arraying member 31, a holding member 32, guide plates 33 and 33, and a driving member 34. As shown in FIG. 1, the arraying section 30 is inclined at a predetermined angle (in this embodiment, 15 degrees) with respect to the retaining section 10. Thus, the optical fibers arranged in the arraying section closely contact the bottom surfaces of arraying grooves 310a and a friction member 320b of a locking plate 320, as mentioned later, due to their own elasticity, and do not easily come off the grooves 310a.

Figure 6:
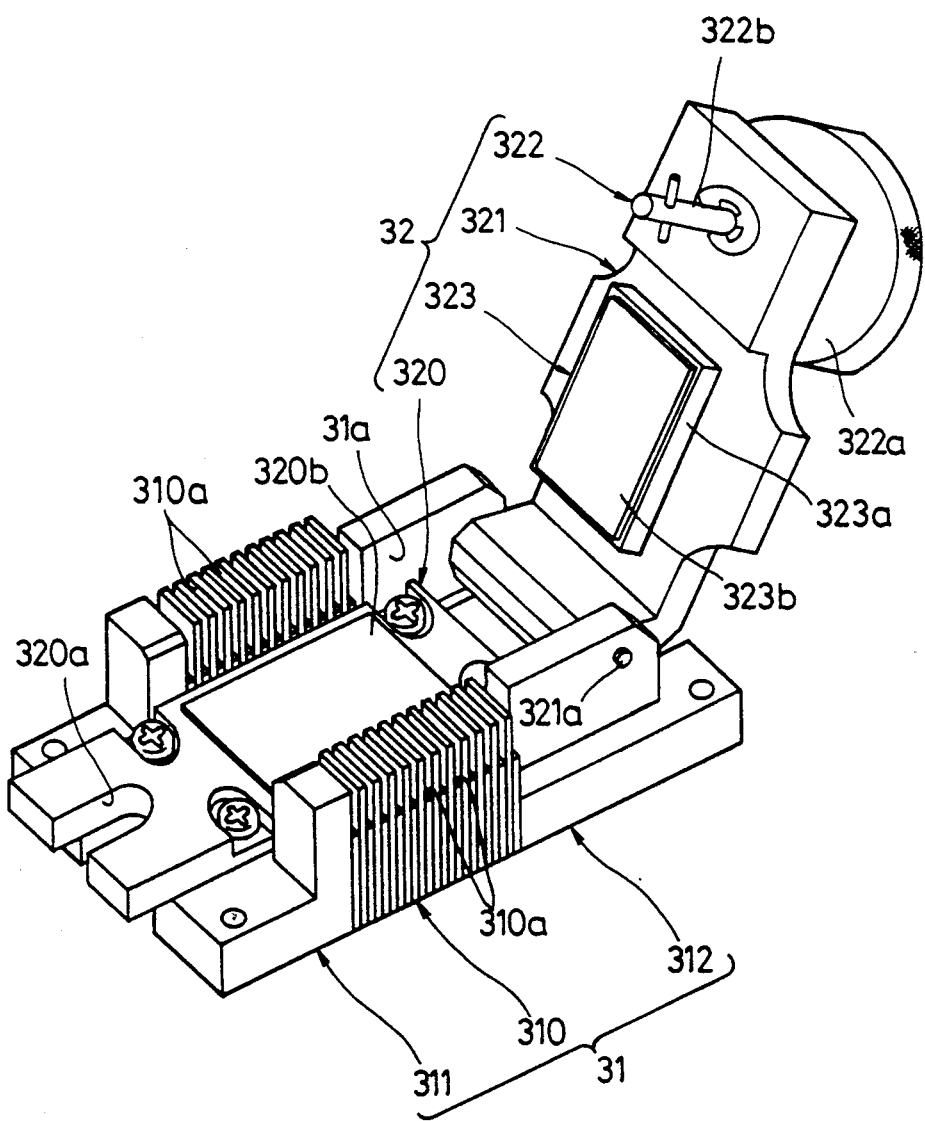
FIG. 6 is a perspective view of an arraying member which is assembled as an integral part of a holding member.

As shown in FIG. 6, the arraying member 31 is assembled as an integral part of the holding member 32, and it forms a U-shaped section 31a, which extends widthwise at the center, together with a groove member 310 and clamping plates 311 and 312 located on both sides, being linked with a bolt 313 into one piece. The groove member 310 comprises a plurality of comb-shaped arraying grooves 310a, which are respectively loaded with a plurality of optical fibers as illustrated and which are provided on both sides of the U-shaped section 31a, thin plates, each thereof having a thickness of approximately 0.5 mm corresponding to the diameter of an optical fiber and having a U shape when observed sideways, being provided with thin plates having the same thickness between them.

The holding member 32 has a locking plate 320, a tilting plate 321, a locking member 322, and a pressing member 323 as shown in FIG. 6.

The locking plate 320 is located widthwise on the U-shaped section 31a, and it locks the tilting plate 321 by the locking member 322 to hold a plurality of optical fibers, which are arranged in the respective arraying grooves 310a of the groove member 310, in the U-shaped section 31a. The locking plate 320 has a notch 320a for retaining the locking member 322 formed in one side and it has a friction material 320b made of rubber or the like attached to the top surface.

As illustrated, one end of the tilting plate 321 is attached to the clamping plate 312 through a support pin 321a so that it is allowed to rise and fall, while the other end is provided with the locking member 322 which retains the holding member 32 in its down position onto the arraying member 31.

The locking member 322 has a locking knob 322a, inserting shaft 322b, a locking pin 322c, and a return spring 322d. The inserting shaft 322b is inserted in a notch 320a, and the locking pin 322c is locked around the notch 320a at the bottom of the locking plate 320 to retain the tilting plate 321 onto the locking plate 320. At this time, the locking knob 322a is always energized upward by the return spring 322d installed between itself and the tilting plate 321 in FIG. 4.

The pressing member 323 has a pressing plate 323a and a friction material 323b made of rubber or the like which is attached as an integral part to the bottom surface of the pressing plate 323a.

Figure 5:
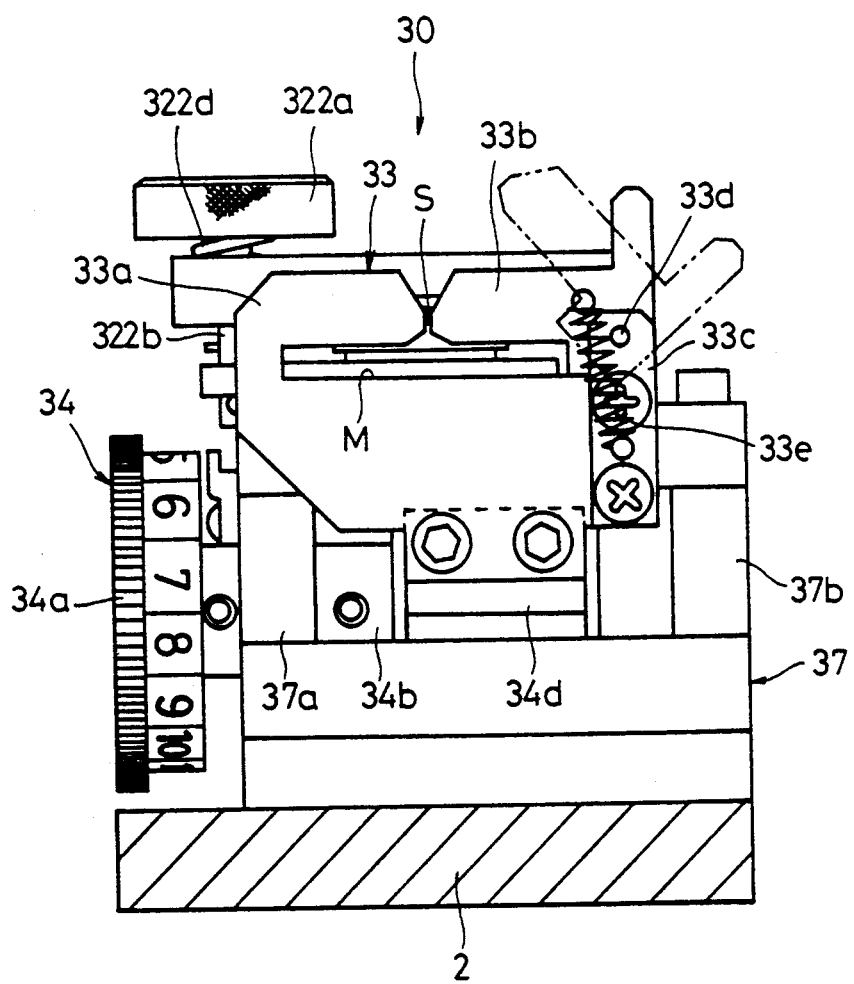
FIG. 5 is a cross-sectional view of the aligning jig for loose wires shown in FIG. 1, the view being taken along the line V—V.

As shown in FIG. 1 and FIG. 2, the guide plates 33 are plate members which are located on both sides of the arraying member 31 and which are moved by the driving member 34 in the direction of the width of the base 2; they guide respective optical fibers into predetermined arraying grooves 310a. As shown in FIG. 5, the guide plate 33 has a base plate 33a and a rotary plate 33b; both plates 33a and 33b together form a guide slit S at the top and also an opening M which is wider than the groove member 310. The bottom part of the base plate 33a is fixed to a cam follower 34d of the driving member 34, mentioned later. The rotary plate 33b is rotatably supported via a pin 33d by a support plate 33c mounted on one side of the base plate 33a, and is urged in one direction by a spring 33e interposed between the rotary plate 33b and the support plate 33c. Namely, the rotary plate 33b is urged in a closing direction when it is tilted as indicated by the solid line in FIG. 5 and thus the spring 33e is located to the left of the pin 33d, and is urged in an opening direction when it is raised as indicated by the two-dot chain line in the same figure and the spring 33e is located to the right of the pin 33d.

When the rotary plate 33b is tilted to the right with respect to the pin 33d, as indicated by the two-dot chain line in FIG. 5, half of the opening M is open.

Figure 4:
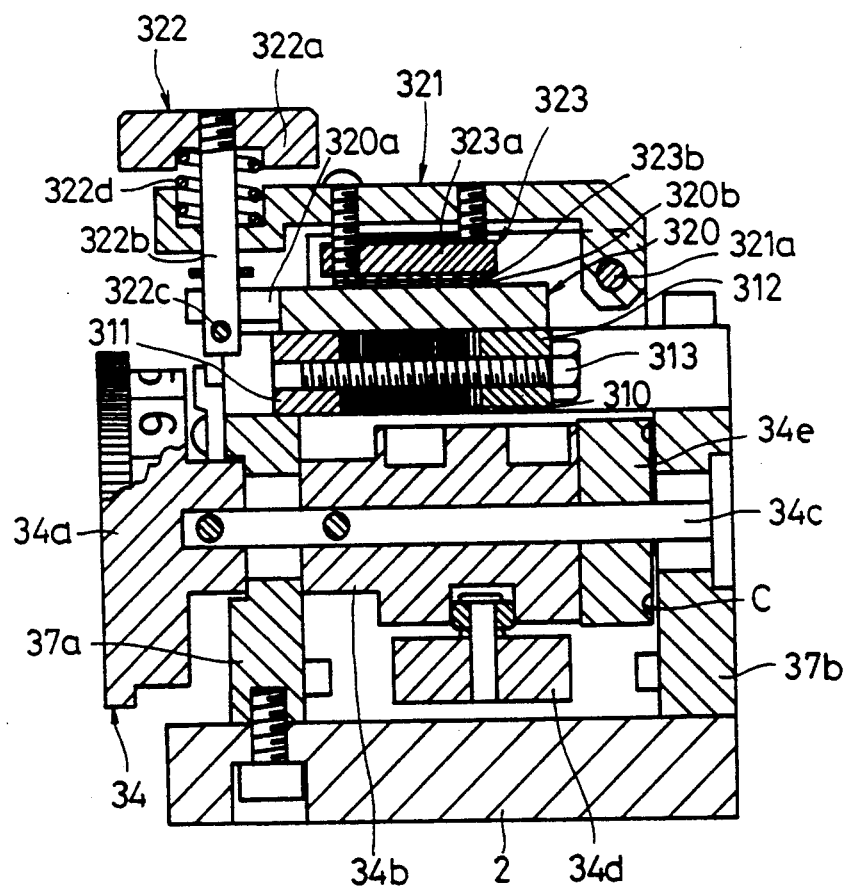
FIG. 4 is a cross-sectional view of the aligning jig for loose wires shown in FIG. 1, the view being taken along the line IV—IV.
Figure 7:
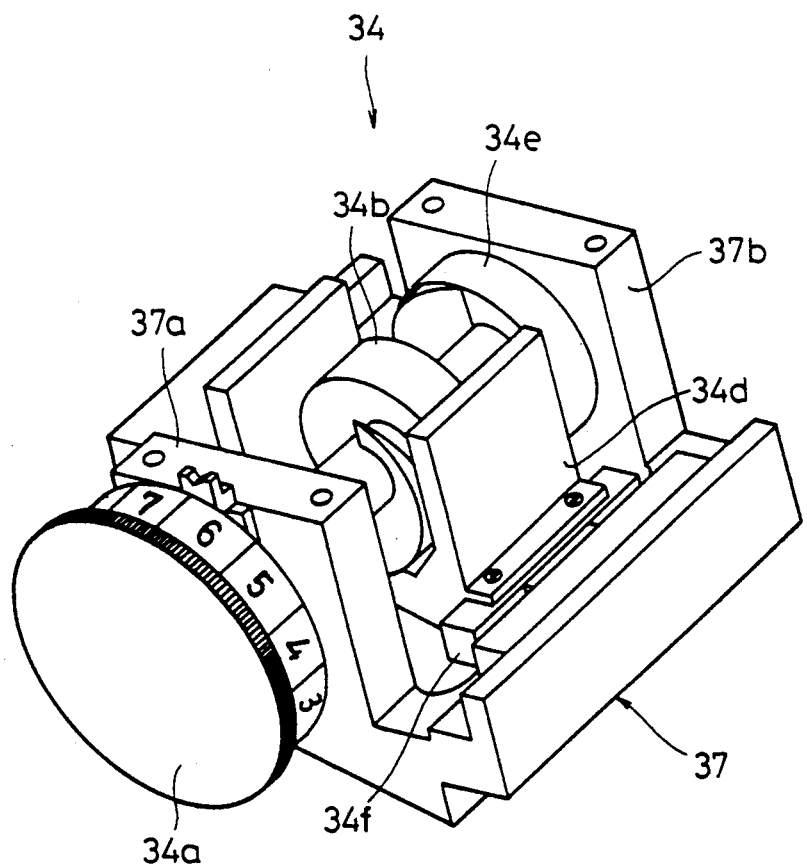
FIG. 7 is a perspective view which shows a driving member.
Figure 8:
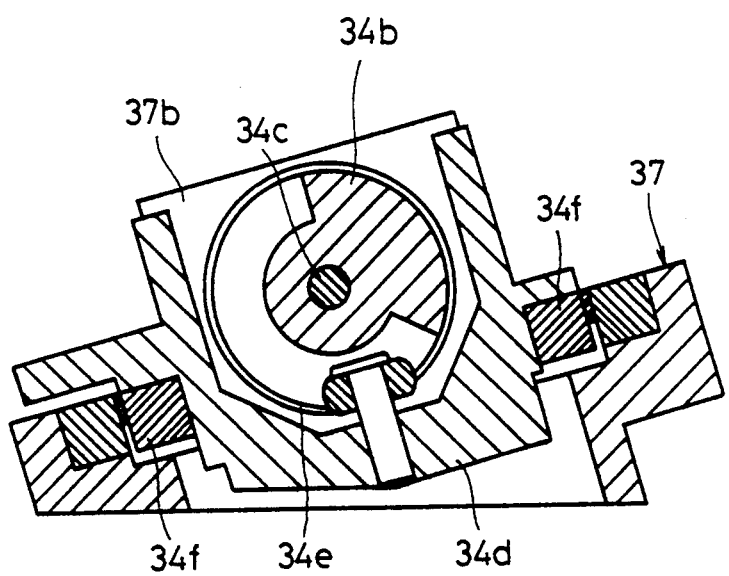
FIG. 8 is a cross-sectional view of the driving member which is cut at the center widthwise.

As shown in FIG. 1 and FIG. 4, the driving member 34 is provided on a support base 37 installed adjacently to the retaining section 10 on the base 2, and it has a control dial 34a, a groove cam 34b, a dial shaft 34c, a cam follower 34d, and a checking board 34e as shown in FIG. 4, FIG. 7, and FIG. 8, the arraying member 31 shown in FIG. 6, which is assembled with the holding member 32 into one piece, being placed thereon.

The control dial 34a is mounted on one side wall 37a of the support base 37 in a manner that allows it to rotate; it is used to move the cam follower 34d as well as the guide plates 33 in the direction of the width of the base 2 and it has numbers 1 through 12 marked in the circumferential direction on its outer periphery. These numbers are provided so that a number, which is shown on the top when the guide plates 33 are moved by the driving member 34, corresponds to an arraying groove 310a into which an optical fiber is guided by the slit S. Accordingly, when, for example, the number given at the top is set to "5" by operating the control dial 34a as shown in FIG. 4 and FIG. 5, the slit S of the guide plates 33 is located in the position of the fifth arraying groove 310a counted from the right in the groove member 310 in the figure, and this position corresponds to the position of "5" on the indicator plate 16.

The groove cam 34b is attached to the dial shaft 34c, and when the control dial 34a is rotated, it rotates with the dial shaft 34c to move the cam follower 34d widthwise.

The dial shaft 34c has its one end locked on the other side wall 37b of the support base 37 and the other end linked to the control dial 34a, thus extending across both side walls 37a and 37b.

The cam follower 34d extends longitudinally with respect to the base 2 and its front and rear rise upward at the point shown in FIG. 4, its front and end portions being supported by the support base 37 via linear slides 34f and 34f as shown in FIG. 1.

The checking board 34e causes the cam follower 34d to be moved by the control dial 34a, i.e., the guide plates 33 to be moved widthwise, for each pitch of the arraying grooves 310a in the groove member 310. This checking board 34e has twelve semispherical recesses C in the circumferential direction at equal intervals in the surface on the side wall 37b side; it rotates as one piece with the dial shaft 34c as the control dial 34a is rotated, and the tip of a ball plunger (not illustrated) provided on the side wall 37b engages with the recess C. This enables the driving member 34 to readily check the movement of the cam follower 34d in the direction of the width for each pitch.

The arranging section 40 arranges a plurality of loose wires, arrayed in the arraying section 30, to a preset specified width; as shown in FIG. 1 and FIG. 2, an arranging roller 43 and a fiber aligner 44 are located adjacently in the longitudinal direction at the top between side walls 41 and 42 which are mounted on the base 2.

The arranging roller 43 is a roller which concentrates a plurality of optical fibers, which are arranged in the arraying grooves 310a of the arraying section 30 and which extend widthwise, toward the center of the width and arranges them to a predetermined width; it has a smaller diameter at the center as illustrated. The arranging roller 43 is positioned such that a plurality of optical fibers extending from the arraying section 30 to the fiber alinger 44 are inclined at a predetermined angle (in this embodiment, e.g., 15 degrees) with respect to the horizontal plane at a location between the arraying section 30 and the arranging roller 43 and at a location between the arranging roller 43 and the fiber aligner 44. By positioning the arranging roller 43 in this manner, it is possible to gather the optical fibers inwardly to a small width by the outer peripheral surface of the arranging roller 43 and due to the aforesaid inclination angle.

The fiber aligner 44 is provided with a fiber groove 44a of a prescribed width at the center, the width being determined by the number of the plurality of optical fibers, and it is installed between the side walls 41 and 42 in a manner that allows it to be installed and removed. The fiber aligner 44 is used for arraying twelve optical fibers, and below it, a fiber aligner 45, which is used for arraying a different number of optical fibers, is installed between the side walls 41 and 42 so that it may be installed and removed.

Further, on the left side surface of the arranging section 40 is mounted an indicator plate 46 which shows the arraying order of a plurality of optical fibers as shown in FIG. 1 and FIG. 2. This indicator plate 46 corresponds to the indicator plate 16 mounted on the arraying section 30; for example, in order to butt and fusion-splice tape fibers, which have been taped into the form of a ribbon by the aligning jig 1, the tape fibers, which are separately located on the right and left sides of the fusing section, must be arranged so that their right and left are reversed against each other. For this reason, as shown in FIG. 1, the indicator plate 16 and the indicator plate 46 have reverse marking on their surfaces like "L" for the left use and "R" for the right use, and the arraying order given in terms of the colors of optical fiber sheaths is reversed. Therefore, when taping a plurality of optical fibers to be fusion-spliced, to form the optical fibers on one side into the form of tape, the number on the control dial 34a is aligned with the number on the indicator plate 16 to lay the optical fibers in the arraying grooves 310a of the arraying section 30, while, to tape the optical fibers on the other side, the number of the control dial 34a is aligned with the number of the indicator plate 46 to lay optical fibers in the arraying groove 310a of the arraying section 30.

Figure 9:
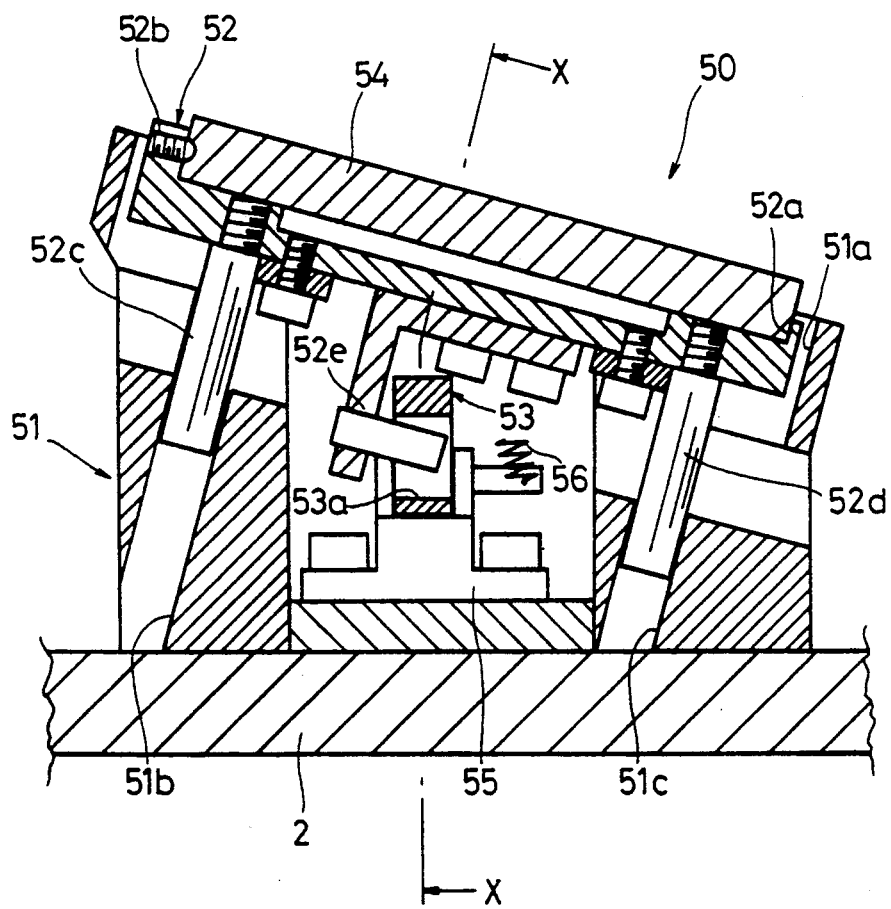
FIG. 9 is a cross-sectional view of a fixing section which is cut at the center widthwise.
Figure 10:
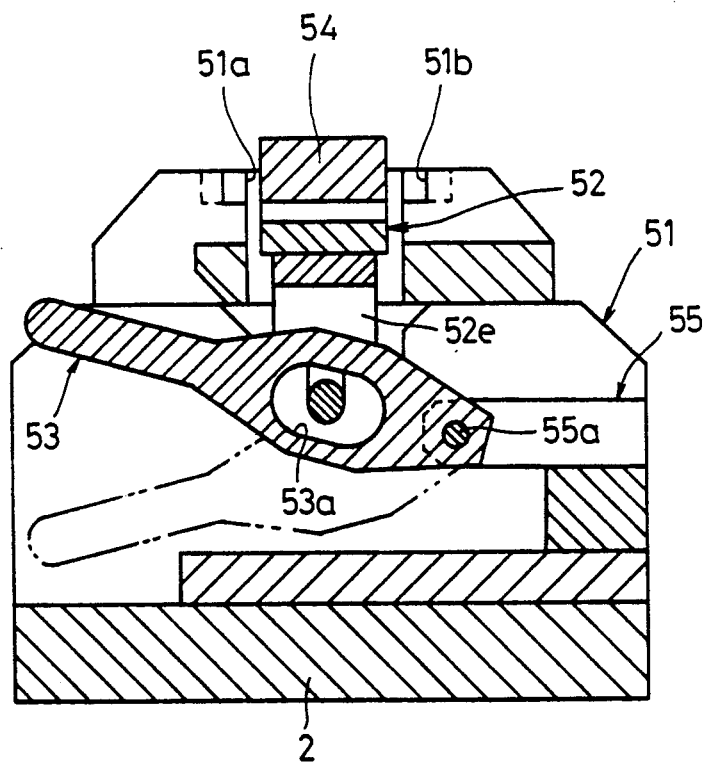
FIG. 10 is a cross-sectional view taken along the line X—X of FIG. 9.

The fixing section 50 functions to glue a plurality of optical fibers, which have been arranged to a predetermined width, while maintaining the arranging order, and to fix them to the arranging width. As shown in FIG. 9 and FIG. 10, the fixing section 50 has a lifting base 52 and a lifting lever 53 provided on a guide block 51, the guide block 51 slanting down from the arranging section 40 side (left in FIG. 9) toward the retaining section 20 side (right in FIG. 9). Further, the guide block 51 has an opening 51a formed at the top center and a mounting recess 51b, in which a fiber holder (not shown) holding a plurality of optical fibers is mounted in such a manner that it may be detached and attached, around the opening 51a.

The lifting base 52 is installed in the opening 51a with a predetermined gap so that it can ascend and descend, and it is provided with a mounting recess 52a, in which the gluing plate 54 is mounted so that it can be attached and detached, and a ball screw 52b which energizes the attached gluing plate 54 to locate it in a specified position. In this embodiment, the gluing plate 54 is a metallic plate having an upper surface coated with fluoroplastic. Also, on the bottom of the lifting base 52 are provided guide shafts 52c and 52d, which are inserted in guide holes 51b and 51c formed in the guide block 51 and which guide the lifting motion, and a crank 52e.

The lifting lever 53 is a lever which has, at the center, an engaging hole 53a with which the crank 52e engages; its one end is attached by a pin 55a to a support base 55 installed on the bottom of the guide block 51 so that it may rotate, and a tension spring 56 (see FIG. 1) extends between the lever and the support base 55. The lifting lever 53 is normally set down and the lifting base 52 is pulled down.

The gluing plate 54 is moved in accordance with a movement of the lifting base 52 moved by the lifting lever 53, and when the base 52 is in a raised position, the gluing plate 54 uniformly contacts at an upper surface thereof the optical fibers extending from the fiber aligner 44 to another fiber aligner 58, mentioned later. Thus, since the optical fibers which are to be applied with an adhesive to be formed into a tape are supported in this manner, the fibers do not slack when formed into a tape. When the lifting base 52 is lowered, the upper surface of the gluing plate 54 is located below the mounting recess 51b, and therefore it does not obstruct the mounting of the fiber holder to the mounting recess 51b.

Further, in the fixing section 50, a fiber aligner 58, which arranges a plurality of optical fibers to a specified width, is installed widthwise across the inserting sections 57 and 57 provided on the retaining section 20 side of the guide block 51 in such a manner that it may be attached and detached. The fiber aligner 58 has a plurality of fiber grooves 58a and 58b, which arrange optical fibers, at the center. The fiber groove 58a is used for arranging twelve optical fibers while the fiber groove 58b is used for arranging a different number of optical fibers.

The aligning jig 1 for loose wires in accordance with the present invention which is configured as described above is used as set forth below when aligning and forming a plurality of loose wires, e.g., a plurality of optical fibers, into a ribbon-like tape. The sheaths of optical fibers used individually have different colors for ease of identification.

First, the tip side of the plurality of optical fibers is jutted out of the right end of the base 2 and the root end side is temporarily fixed by the retaining section 10.

Then, the locking knob 322a is pushed down against the energizing force of the return spring 322d to unlock the locking pin 322c from the periphery of the notch 320a at the bottom of the locking plate 320, thereby to raise the tilting plate 321. This unlocks the tilting plate 321 from the locking plate 320 in the arraying section 30, thus releasing the U-shaped section 31a.

Subsequently, an optional one of the optical fibers temporarily fixed to the retaining section 10 is selected, followed by an identification of a number on the indicator plate 16 corresponding to the sheath color of the selected fiber.

Then, the control dial 34a of the arraying section 30 is operated to move the guide plates 33 and 33 such that the slits S of the individual guide plates are moved to a position corresponding to the identified number. The selected optical fiber is then laid along the corresponding groove 310a of the arraying member 310 while being guided by the individual slits S.

At this time, the correct optical fiber can be selected simply by keying its sheath color to the color shown on the indicator plate 16, and each optical fiber is guided through the slits S to be laid in the prescribed arraying groove 310a; therefore, anybody can easily handle the aligning jig 1 without making mistakes in arranging optical fibers even if he is not skilled in handling the jig.

Thereafter, a similar operation is carried out for the other optical fibers. Namely, an optional optical fiber is successively selected, the control dial 34a is operated to move the slits S of the guide plates 33 and 33 to a position corresponding to an indicator number representing the sheath color of the selected fiber, and the selected fiber is laid along the corresponding arraying groove 310a.

After completion of the laying of optical fibers in the arraying grooves 310a of the groove member 310, the tilting plate 321 is moved down, the locking knob 322a is pushed down against the energizing force of the return spring 322d to engage the locking pin 322c at the bottom of the inserting shaft 322b with the periphery of the notch 320a. This engages the tilting plate 321 with the locking plate 320, thus holding the plurality of optical fibers, which have been arranged in the arraying grooves 310a, by clamping them between the friction material 323b of the pressing member 323 and the friction material 320b of the locking plate 320.

Then, the tip side of the plurality of optical fibers arranged in the arraying grooves 310a is guided through the arranging roller 43 of the arranging section 40 to the fiber aligner 44 while maintaining the arranging order. This causes the plurality of optical fibers to be guided along the periphery of the arranging roller 43, moved toward the central part of the smaller diameter, placed in the fiber groove 44a of the adjoining fiber aligner 44, and arranged to the predetermined width in the arranging section 40.

The optical fibers do not develop any significant friction with the groove member 310, the arranging roller 43 or the fiber aligner 44 when laying the plurality of optical fibers in the above-mentioned arraying grooves 310a or arranging them to the predetermined width in the arranging section 40. Accordingly, the sheaths of the optical fibers do not sustain damage.

After that, the plurality of optical fibers, which have been arranged to the predetermined width, are guided onto the gluing plate 54 of the fixing section 50, and moved through the fiber groove 58a of the fiber aligner 58, then their tip side is temporarily fixed by clamping it by the clamping member 23 of the retaining section 20 located at the right end.

Under this condition, the lifting lever 53 is raised to pull up the lifting base 52, and an adhesion treatment is carried out at the fixing section 50, i.e., the optical fibers are spliced together to form a tape portion having a predetermined width. At this time, the gluing plate 54 uniformly contacts the optical fibers at the upper surface thereof and supports same from below, whereby the optical fibers are not loosened when applied with the adhesive.

More specifically, in the fixing section 50, an adhesive agent, e.g., ultraviolet curing resin, is applied to the plurality of optical fibers on the gluing plate 54 and ultraviolet rays are irradiated to the adhesive agent to cure it, thus shaping the optical fibers into a ribbon-like tape of the predetermined width. For the adhesion treatment, erroneous arrangement of the plurality of optical fibers can be prevented by checking the arranging order of the optical fibers in advance by using an inspection jig such as a cylindrical lens.

Then, the lifting lever 53 of the fixing section 50 is lowered to push the lifting base 52 down to peel the plurality of optical fibers, which have been shaped into a tape, from the gluing plate 54, and the clamping members 13 and 23 of the retaining sections 10 and 20 are lifted to release the temporary fixing of the plurality of optical fibers.

Next, in the arraying section 30, the engagement between the locking member 322 and the locking plate 320 is released, the tilting plate 321 is raised to unclamp the optical fibers arranged in the arranging grooves 310a, and at the same time, the control dial 34a is set at the number "12" to move the guide plates 33 and 33 in one direction. While in this state, the rotary plate 33b of each guide plate 33 is tilted to make half of the opening M released, and the optical fibers having end portions spliced together in the form of a tape are taken out of the aligning jig 1. Then, another set of optical fibers are subjected to the above-described process.

When handling the optical fibers having end portions thereof spliced in the form of a tape, first, the lifting base 52 is lowered by operating the lever 53 to detach the optical fibers from the gluing plate 54, and the clamping member 23 of the retaining section 20 is raised, to thereby release the temporary fixing of the optical fibers.

Subsequently, the gluing plate 54 is removed from the mounting recess 52a of the lifting base 52, and a fiber holder, not shown, is fitted in the mounting recess 51b of the guide block 51 so that the spliced portion of the optical fibers is held by the fiber holder. Thus, the optical fibers having end portions formed into a tape are always held at a specified portion for handling.

Then, the locking member 322 of the arraying section 30 is disengaged from the locking plate 320, the tilting plate 321 is lifted to release the clamped optical fibers arrayed along the grooves 310a, and the control dial 34a is set at the number "12" to move the guide plates 33 and 33 in one direction. While in this state, the rotary plate 33b of each guide plate 33 is tilted to make half of the opening M open, and the clamping member 13 of the retaining section 10 is raised.

After the optical fibers temporarily fixed by the retaining sections 10 and 20 are released, the aforesaid fiber holder is detached from the mounting recess 51b of the guide block 51. The optical fibers thus held by the fiber holder are subjected to end processing, and fusion-spliced to a tape fiber or to a plurality of optical fibers having ends thereof similarly formed into a tape.

In the above embodiment, the explanation is given on a case where a plurality of optical fibers are aligned, but it is needless to say that the aligning jig 1 can be used for any other loose wires including electric wires in addition to optical fibers.

What is claimed is:

1. An aligning jig for loose wires, comprising:
   first and second retaining means for temporarily fixing a plurality of loose wires therebetween,
   arraying means, positioned between said first and second retaining means, for arraying said loose wires in an optional loading order in a plurality of arraying grooves arrayed widthwise for holding the loose wires in a predetermined order,
   at least one arranging means, positioned adjacent said arraying means and between said first and second retaining means, for arranging the loose wires, arrayed in said arraying means, to a preset specified width, and
   fixing means, positioned adjacent said arranging means and between said first and second retaining means, for gluing said loose wires, which have been temporarily fixed by said first and second retaining means and arranged to the specified width, while maintaining said predetermined order, to fix the wires to said specified width.

2. The aligning jig for loose wires according to claim 1, wherein each of said first and second retaining means comprises:
   a support base, and
   clamping means, which is mounted on said support base in a manner that allows said clamping means to rise and fall and which engages with said support base, for temporarily fixing said plurality of loose wires.

3. The aligning jig for loose wires according to claim 2, wherein said clamping means comprises:
   a surface that engages with said support base, and
   pressing means mounted on said surface for pressing said loose wires against said support base.

4. The aligning jig for loose wires according to claim 3, further including at least one adjusting means for mounting said pressing means on said clamping means so as to permit adjustment of the pressing force applied to said loose wires against said support base.

5. The aligning jig for loose wires according to claim 1, wherein said arraying means comprises:
   an arraying member having said plurality of arraying grooves for individually holding said loose wires,
   a holding member for retaining said plurality of loose wires arranged in the respective arraying groove of said arraying member,
   at least one guide plate for guiding each of said plurality of loose wires into each arraying groove of said arraying member, and
   a driving member, to which said at least one guide plate is attached, for:
      supporting said arraying member and said holding member, and
      moving said arraying member and said holding member in an arraying direction of said arraying grooves for each pitch so as to lay said respective loose wires in said respective arraying grooves in an optional order while guiding said loose wires by said at least one guide plate, thereby arraying said loose wires in a predetermined order.

6. The aligning jig for loose wires according to claim 5, wherein said arraying member includes:
   a groove member having said plurality of arraying grooves, each groove being defined by:
      first thin plates, each of the thin plates having a thickness corresponding to the diameter of a loose wire and having a first height, and
      second thin plates, each having the same thickness, interleaved between said first thin plates; and
   clamping plates located on both sides of said groove member.

7. The aligning jig for loose wires according to claim 6, wherein said arraying means is arranged adjacent to and inclined with respect to the first retaining means such that the optical fibers laid along the arraying grooves closely contact bottom surfaces of the arraying grooves due to elasticity thereof and are prevented from slipping off the arraying grooves.

8. The aligning jig for loose wires according to claim 5, wherein said holding member comprises:

a locking plate mounted on said arraying member, a tilting plate which is attached to said arraying member in a manner that enables said tilting plate to tilt and which is provided with a pressing member for holding said plurality of loose wires in cooperation with said locking plate, and a locking member for retaining said tilting plate onto said locking plate in a manner that allows installation and removal of said loose wires therebetween.

9. The aligning jig for loose wires according to claim 5, wherein said at least one guide plate has a base plate and a rotary plate, said base plate and rotary plate forming a guide slit for guiding said plurality of loose wires into respective arraying grooves of said arraying member, and an opening which extends widthwise.

10. The aligning jig for loose wires according to claim 5, wherein said driving member includes:

a control dial, a dial shaft connected with said central dial, a groove cam attached to said dial shaft, and a cam follower which engages with said groove cam and to which said at least one guide plate is attached, said at least one guide plate being moved in the arraying direction of said arraying grooves for each pitch by turning said control dial.

11. The aligning jig for loose wires according to claim 1, wherein said at least one arranging means includes:

an arranging roller with a smaller diameter at a central part thereof, and a fiber aligner with a fiber groove of a specified width which is determined by the number of optical fibers, said fiber aligner being adjacent said arranging roller.

12. The aligning jig for loose wires according to claim 11, wherein said arranging roller is positioned such that a plurality of optical fibers extending from the arraying means to the fiber aligner are inclined at a predetermined angle with respect to a horizontal plane at a location between the arraying means and the arranging roller and at a location between the arranging roller and the fiber aligner.

13. The aligning jig for loose wires according to claim 1, wherein said fixing means comprises:

a guide block, a lifting base installed on said guide block in a manner that enables said lifting base to move up and down, a gluing plate attached to said lifting base in a manner that permits installation and removal of said gluing plate, and a lifting lever for moving said lifting base up and down, said plurality of loose wires, which have been arranged to the specified width in said at least one arranging means, being glued with each other on said gluing plate, which is attached to said lifting base, while maintaining said predetermined order.

* * * * *